United States Patent
Zhao et al.

(10) Patent No.: US 9,007,942 B2
(45) Date of Patent: Apr. 14, 2015

(54) ITERATIVE COVARIANCE INVERSION BASED ON LINEAR RECEIVER DESIGNS

(75) Inventors: Wanlun Zhao, San Diego, CA (US); Fuyun Ling, San Diego, CA (US); Mingxi Fan, San Diego, CA (US); Jinghu Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 13/565,316

(22) Filed: Aug. 2, 2012

(65) Prior Publication Data

US 2014/0036698 A1 Feb. 6, 2014

(51) Int. Cl.
*H04L 1/00* (2006.01)
*H04W 24/02* (2009.01)
*H04L 25/03* (2006.01)

(52) U.S. Cl.
CPC ......... *H04W 24/02* (2013.01); *H04L 25/03133* (2013.01)

(58) Field of Classification Search
CPC ...... H04L 47/10; H04L 43/50; H04L 12/2697
USPC ........................................................ 370/252
See application file for complete search history.

(56) References Cited

U.S. PATENT DOCUMENTS

| | | | |
|---|---|---|---|
| 6,876,693 B2 | 4/2005 | Sim | |
| 2002/0024994 A1* | 2/2002 | Piirainen et al. | 375/231 |
| 2006/0156207 A1* | 7/2006 | Vithanage et al. | 714/792 |
| 2011/0187584 A1 | 8/2011 | Pun et al. | |
| 2011/0268019 A1 | 11/2011 | Tang et al. | |
| 2012/0002743 A1 | 1/2012 | Cavalcante et al. | |
| 2012/0076248 A1 | 3/2012 | Rosenqvist | |
| 2012/0127870 A1 | 5/2012 | Zhao et al. | |
| 2013/0235956 A1* | 9/2013 | Shen et al. | 375/340 |

OTHER PUBLICATIONS

Horlin F. et al., "Space-Time Block Coding for Uplink Single-Carrier CDMA with Joint Detection in the Frequency Domain", IEEE Transactions on Wireless Communications, Jun. 1, 2007, pp. 2096-2105, vol. 6, No. 6, IEEE Service Center, XP011185950, ISSN: 1536-1276, DOI: 10.1109/TWC.2007.05622.
International Search Report and Written Opinion—PCT/US2013/053510—ISA/EPO—Oct. 17, 2013.
Jianshu et al., "New recursive algorithm for matrixin version", Chinese Journal of Systems Engineering and Electronics, Second Academy Ministry of Aero-Space Industry, Apr. 1, 2008, pp. 381-384, vol. 19, No. 2, XP011377152, ISSN: 1004-4132, DOI: 10.1109/JSEE.2008.6072546.

(Continued)

*Primary Examiner* — Andrew Lai
*Assistant Examiner* — Jamaal Henson
(74) *Attorney, Agent, or Firm* — Kristine U. Ekwueme

(57) ABSTRACT

A method of wireless communication includes receiving a wireless signal at a linear receiver, and iteratively computing an inverted covariance matrix in frequency domain, one channel code at a time. The method also includes computing receiver demodulation coefficients based on the inverted covariance matrix and the frequency domain channel estimate or time domain channel estimate. The method further includes deriving a transmitter symbol based on a received signal vector and the coefficients.

20 Claims, 6 Drawing Sheets

(56) References Cited

OTHER PUBLICATIONS

Tresch R., et al., "LMMSE Channel Estimation for Mimo W-Cdma With Out-Of-Cell Interference Mitigation", Signals, Systems and Computers, 2008 42nd AsiloMar Conference on, IEEE, Piscataway, NJ, USA, Oct. 26, 2008, pp. 331-335, XP031475295, ISSN: 978-1-4244-2940-0, Section III.

Vollmer M. et al., "Comparative Study of Joint-Detection Techniques for TD-CDMA Based Mobile Radio Systems", IEEE Journal on Selected Areas in Communications, Aug. 1, 2001, pp. 1461-1475, vol. 19, No. 8, IEEE Service Center, XP001115203, ISSN: 0733-8716, DOI: 10.1109/49.942509.

* cited by examiner

ITERATIVE COVARIANCE INVERSION BASED ON LINEAR RECEIVER DESIGNS

BACKGROUND

1. Field

Aspects of the present disclosure relate generally to wireless communication systems, and more particularly, to linear minimum mean square error (MMSE) receivers in a wireless network, such as a Time Division-Synchronous Code Division Multiple Access (TD-SCDMA) network.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, High Speed Downlink Packet Access (HSDPA) and High Speed Uplink Packet Access (HSUPA), that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

In accordance with an aspect of the present disclosure, a method of wireless communication is presented. The method includes receiving a wireless signal at a linear receiver. The method further includes computing a time domain channel estimate of the wireless signal and computing a frequency domain channel estimate based on the time domain channel estimate. The method also includes iteratively computing an inverted covariance matrix in frequency domain, one channel code at a time. The method still further includes computing receiver demodulation coefficients based on the inverted covariance matrix and the frequency domain channel estimate or time domain channel estimate. The method also includes deriving a transmitter symbol based on a received signal vector and the coefficients.

According to another aspect, an apparatus for wireless communication is presented. The apparatus includes means for receiving a wireless signal at a linear receiver. The apparatus also includes means for computing a time domain channel estimate of the wireless signal and means for computing a frequency domain channel estimate based on the time domain channel estimate. The apparatus further includes means for iteratively computing an inverted covariance matrix in frequency domain, one channel code at a time. The apparatus still further includes means for computing receiver demodulation coefficients based on the inverted covariance matrix and the frequency domain channel estimate or time domain channel estimate. The apparatus also includes means for deriving a transmitter symbol based on a received signal vector and the coefficients.

According to yet another aspect, a computer program product for wireless communication in a wireless network is presented. The computer program product includes a non-transitory computer-readable medium having non-transitory program code recorded thereon. The program code includes program code to receive a wireless signal at a linear receiver. The program code also includes program code to compute a time domain channel estimate of the wireless signal and program code to compute a frequency domain channel estimate based on the time domain channel estimate. The program code further includes program code to iteratively compute an inverted covariance matrix in frequency domain, one channel code at a time. The program code still further includes program code to compute receiver demodulation coefficients based on the inverted covariance matrix and the frequency domain channel estimate or time domain channel estimate. The program code also includes program code to derive a transmitter symbol based on a received signal vector and the coefficients.

According to still another aspect, an apparatus for wireless communication is presented. The apparatus includes a memory and at least one processor coupled to the memory, the at least one processor. The processor(s) is configured to receive a wireless signal at a linear receiver. The processor(s) is also configured to compute a time domain channel estimate of the wireless signal and to compute a frequency domain channel estimate based on the time domain channel estimate. The processor(s) is further configured to iteratively compute an inverted covariance matrix in frequency domain, one channel code at a time. The processor(s) is still further configured to compute receiver demodulation coefficients based on the inverted covariance matrix and the frequency domain channel estimate or time domain channel estimate. The processor(s) is also configured to derive a transmitter symbol based on a received signal vector and the coefficients.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
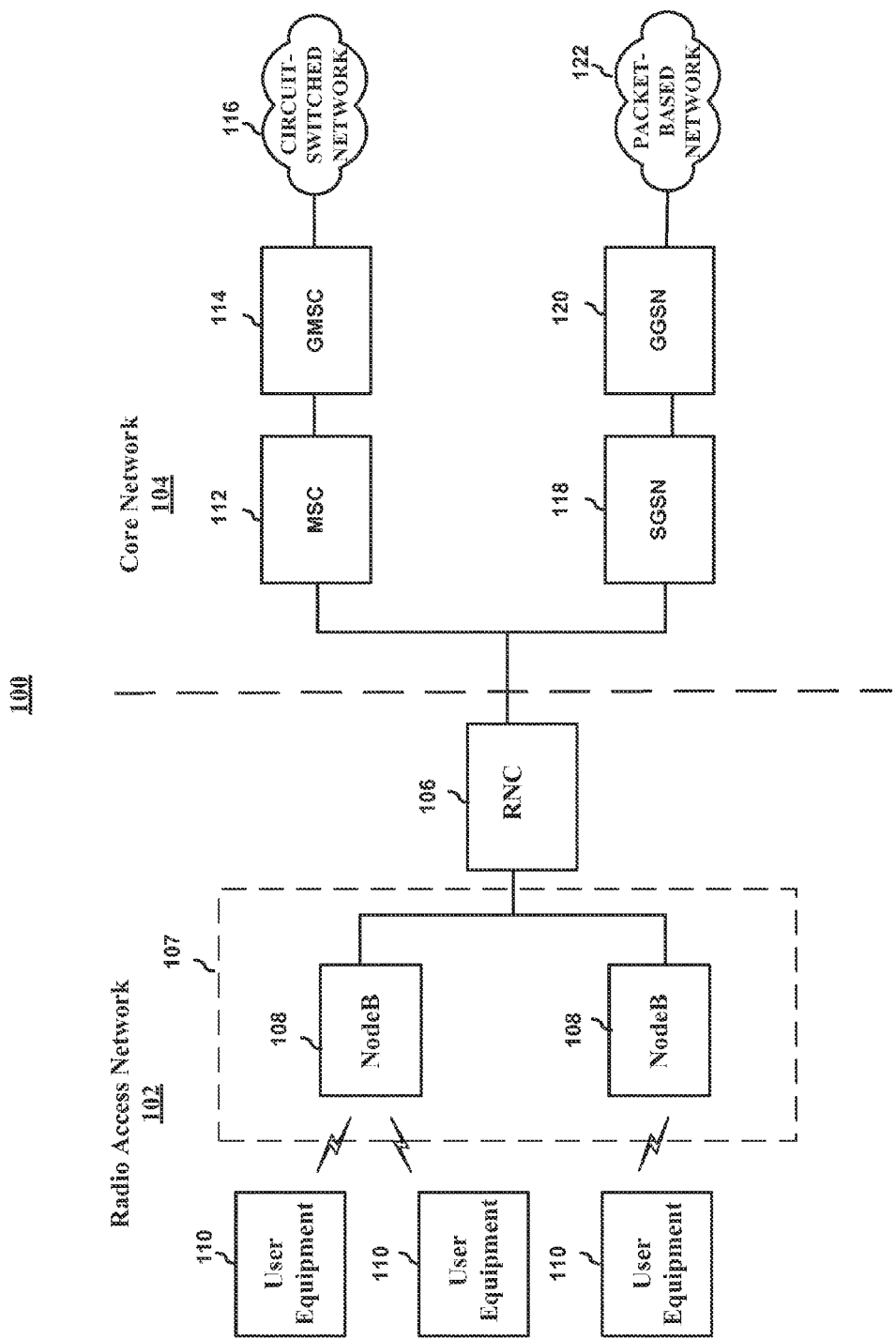
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency domain duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
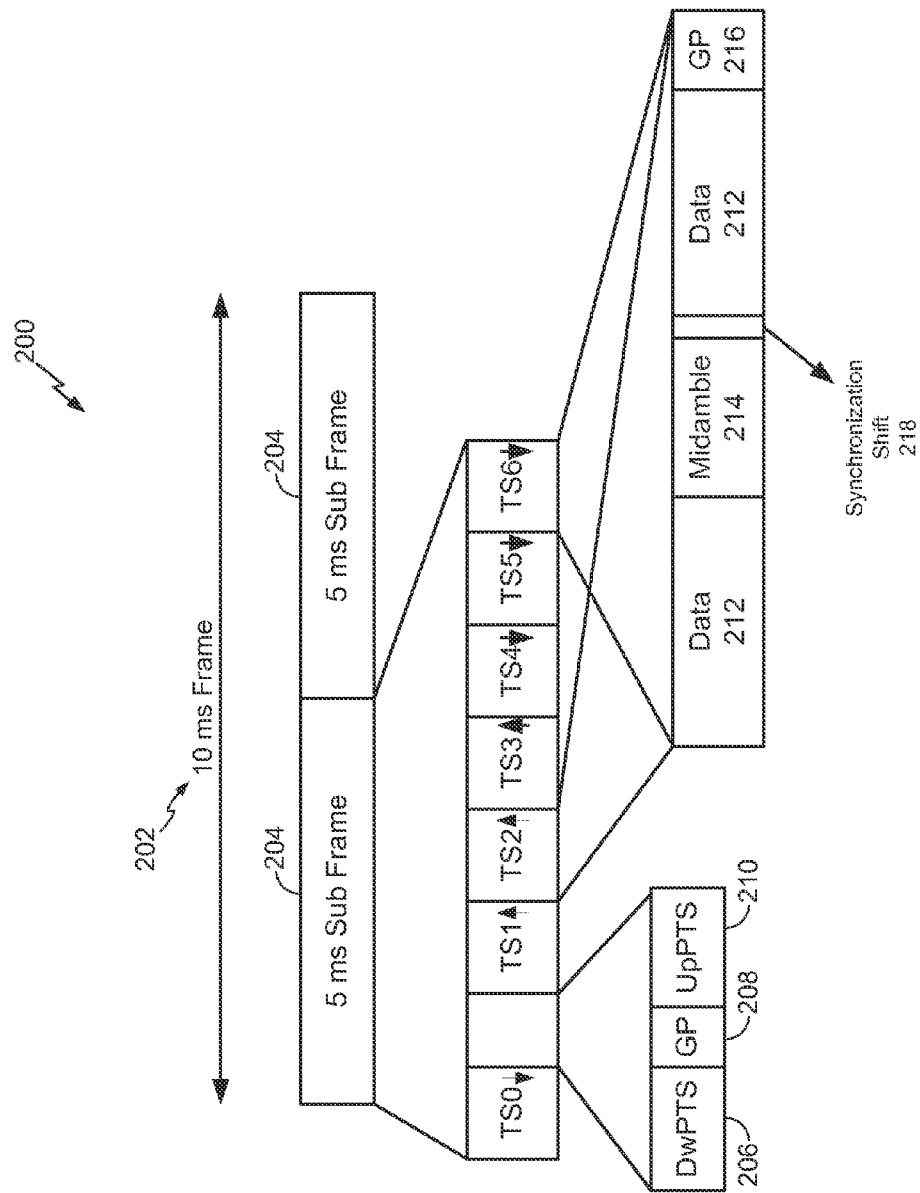
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The chip rate in TD-SCDMA is 1.28 Mcps. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including Synchronization Shift (SS) bits 218. Synchronization Shift bits 218 only appear in the second part of the data portion. The Synchronization Shift bits 218 immediately following the midamble can indicate three cases: decrease shift, increase shift, or do nothing in the upload transmit timing. The positions of the SS bits 218 are not generally used during uplink communications.

Figure 3:
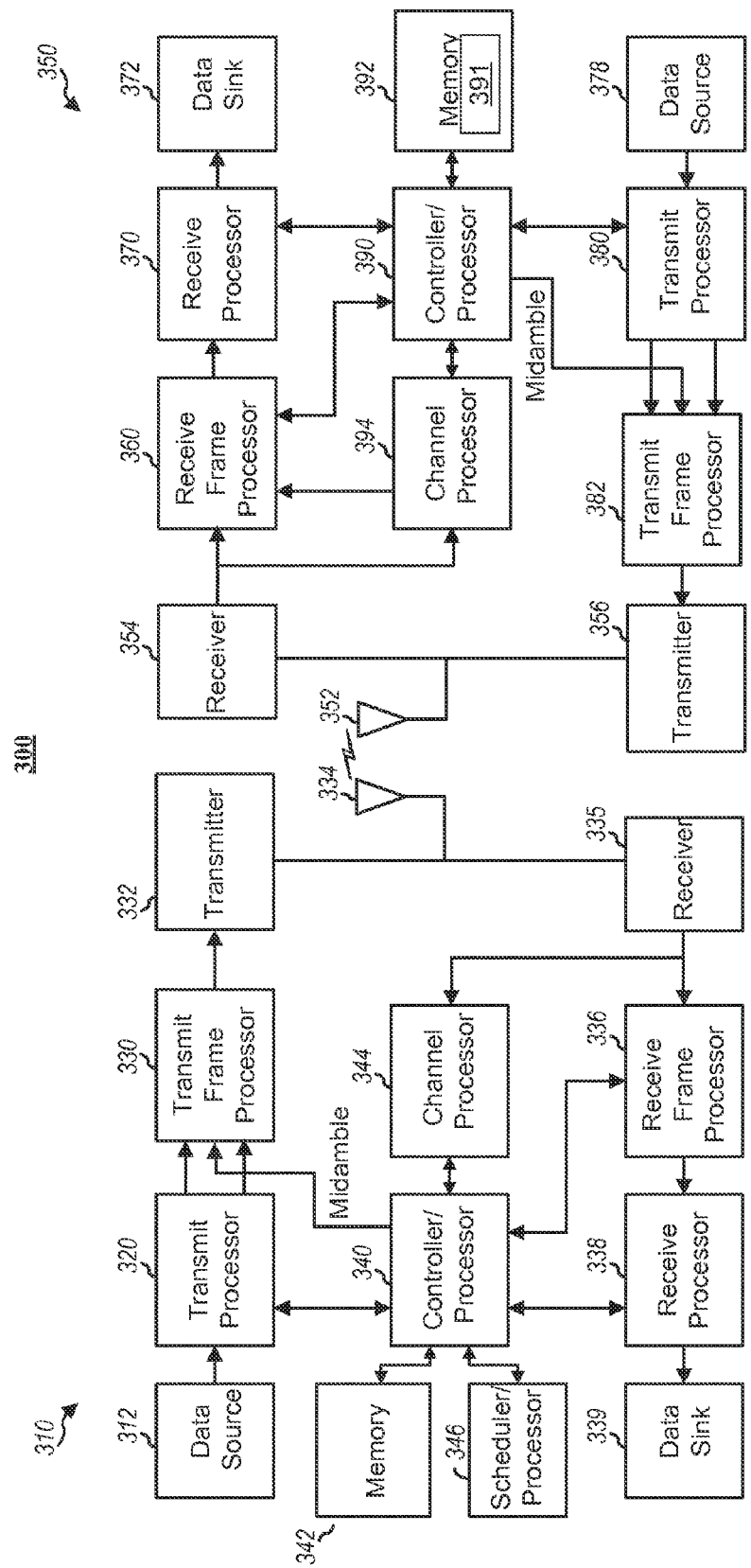
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames.

The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the nodeB 310 and the user equipment (UE) 350, respectively. For example, the controller/processors 340 and 390 may provide various functions including timing, peripheral interfaces, voltage regulation, power management, and other control functions. The computer readable media of memories 342 and 392 may store data and software for the nodeB 310 and the UE 350, respectively. For example, the memory 392 of the UE 350 may store an iterative covariance module 391 which derives a transmitter symbol, when executed by the controller/processor 390, and configures the UE 350 for deriving the transmitter symbol. A scheduler/processor 346 at the nodeB 310 may be used to allocate resources to the UEs and schedule downlink and/or uplink transmissions for the UEs.

Iterative Covariance Inversion

In TD-SCDMA downlink (e.g., TD-SCDMA downlink), a UE may receive highly structured signals from several strong cells. A complex receiver may exploit interfering signal structures (e.g., Walsh domain power characteristics and channel frequency selectivity). In some current deployments, linear joint detectors may be used in downlink time slots 0 and 3. In these slots, a UE may experience a small number of active Walsh codes due to, for example, downlink beamforming Hence, signals for serving and interfering cells are often in a subspace of a received signal, which will be exploited to lower receiver complexity.

A linear minimum mean square error (MMSE) receiver based on a block fast Fourier transform (FFT) frequency domain scheme is disclosed for a TD-SCDMA system. One aspect of the present solution includes an iterative matrix inversion for time domain covariance inversions. The aspect includes iteratively computing an inverted covariance matrix in a frequency domain, one channel code at a time. Provided below are details of a MMSE receiver based on a block fast Fourier transform (FFT) frequency domain scheme. The MMSE receiver may sometimes be referred to as linear multicell joint detector (MCJD) or linear multiuser detectors (LMUD).

According to one aspect, in a fractionally spaced design, the MMSE receiver may implement a branch selection based approach because the complexity may be less than a complexity of branch combining based alternatives. After selection from even or odd sample branches, the subsequent receiver design becomes chip rate. According to the present aspect, the MMSE receiver receives a time domain signal vector. The time domain vector is then converted to a frequency domain signal vector. Channel estimates are then derived for the frequency domain signal vector and an inverted covariance matrix is iteratively computed, one channel code at a time. Receiver demodulation coefficients are computed based on the inverted covariance matrix and the frequency domain channel estimate. The receiver demodulation coefficients may also be computed based on the inverted covariance matrix and a time domain channel estimate.

Finally, a transmitter symbol is derived based on a received signal vector and the coefficients.

The aspect described above provides for a less complex system that is desirable for a hardware implementation. That is, computing an inverted covariance matrix is a simpler mathematical process and may reduce the complexity of receiver hardware. Moreover, because the inverted covariance matrix is iteratively computed, one channel code at a time, when the number of active Walsh channels is low, the receiver may only calculate a few iterations of the inverted covariance matrix calculations.

As described above, the receiver may receive a time domain signal vector. At the $r^{th}$ antenna, the received time domain signal vector ($y_r$) of the selected branch is denoted as follows:

$$y_r = \sum_{i=0}^{S-1} H_{ir} C_i W G_i s_i + n_r \quad r \in \{0, 1\} \tag{1}$$

That is, $y_r$ is a time domain model for the vector received from the base station at a UE. Referring to Equation 1, r is the receiving antenna index, index i is the beam index, $s_i$ is a 16N×1 symbol vector carried by the $i^{th}$ beam. The vector is a block model with block size N. That is, N blocks of 16×1 symbol vectors are simultaneously considered. $H_{ir}$ is a 16N×16N channel matrix and is approximated as a circulant matrix. The variable $H_{ir}$ is the channel, in matrix form, received at the UE. The diagonal gain matrix $G_i$ refers to a 16N×16N indicator matrix defined as:

$$G_i = I_N \otimes G_{i,Q} \tag{1a}$$

Referring to Equation 1a, $\otimes$ is the Kronecker product, $I_N$ is the N×N identity matrix, and the diagonal entries of $G_{i,Q}$ are either 0 or 1 indicating active or non active of the corresponding Walsh channels. According to the present aspect, Q is sixteen.

Referring to Equation 1, W is the Walsh matrix and $C_i$ is a scrambling matrix, the Walsh and scrambling matrices may be defined as $$W = I_N \otimes W_Q \tag{1b}$$

$$C_i = I_N \otimes C_{i,Q} \tag{1c}$$

In Equation 1b, $W_Q$ is a 16×16 Walsh matrix. In Equation 1c, $C_{i,Q}$ is a 16×16 diagonal scrambling matrix In the following aspect, it is assumed that every beam only includes one active Walsh channel. That is, if a beam has ten active Walsh codes, it will be replaced by ten smaller virtual beams each having one active Walsh channel. Furthermore, a 16×1 matrix $G_{i,Q}^+$ may be utilized and may only include one non-zero column of $G_{i,Q}$. Additionally, the scrambled Walsh vector for the active Walsh code may be defined as follows:

$$u_{i,Q} = C_{i,W} W_Q G_{i,Q}^+ \tag{2}$$

Furthermore, a 16N×N matrix $U_i$ is defined as follows:

$$U_i = I_N \otimes u_{i,Q} \tag{2}$$

In view of the modifications described above, the vector model for the received time domain vector is as follows:

$$y_r = \sum_{i=0}^{S-1} H_{ir} U_i s_i + n_r \quad r \in \{0, 1\} \tag{3}$$

In Equation 3, $s_i$ is the symbol vector, however, unlike Equation 1, the symbol vector is now an N×1 vector. That is, only entries corresponding to $G_{i,Q}^+$ are kept. It should be noted that Equation 3 is a mathematical equivalent of Equation 1.

According to the present disclosure, the received time domain vector is converted to a frequency domain vector via block FFTs. It should be noted that in a typical system, the time domain vector is not converted to a frequency domain vector. The unitary block FFT matrix is defined as:

$$F_k = F \otimes I_k \qquad (4)$$

In Equation 4, F is the unitary N×N conventional FFT matrix and $I_k$ is a k×k identity matrix. The block FFT is distinguishable from a conventional FFT. The model for the frequency domain vector is $$r := F_Q y_r = \sum_{i=0}^{S-1} F_Q H_{ir} U_i F^H F s_i + F_Q n_r := \sum_{i=0}^{S-1} D_{ir} x_i + n_r \qquad (5)$$

In Equation 5, $n_r$ is a frequency domain additive white Gaussian noise (AWGN) vector. Because the unitary $F_Q$ does not change its statistics, the frequency domain symbol vector $(x_i)$ may be defined as $$x_i := F s_i \qquad (5a)$$

It should be noted that, statistically, $x_i$ and $s_i$ have the same first and second order statistics. The block diagonal channel matrix $D_{ir}$ has a dimension 16N×N with a diagonal block size 16×1 and there are a total of N blocks. That is, each entry of the N×1 vector $(x_i)$ has an equivalent 16×1 frequency domain channel vector and is included in one of N blocks in a frequency domain. Equation 6 illustrates the matrix for $D_{ir}$.

$$D_{ir} := \begin{bmatrix} d_{i,r,1} & 0 & 0 \\ 0 & \ddots & 0 \\ 0 & 0 & d_{i,r,N} \end{bmatrix} \qquad (6)$$

Upon determining the frequency domain vector model, a frequency domain time channel estimate is calculated. It should be noted that the frequency domain vector model may be simplified to the following receiver model:

$$r_r := \sum_{i=0}^{S-1} D_{ir} x_i + n_r \qquad (7)$$

Because a frequency domain channel matrix is block diagonal, the frequency domain time channel estimate may concentrate on a cross antenna combining for a single block (e.g., the $k^{th}$ block). The $k^{th}$ block may be expressed as follows:

$$r_{r,k} := \sum_{i=0}^{S-1} d_{i,r,k} x_{i,k} + n_{r,k} \qquad (8)$$

Referring to Equation 8, $x_{i,k}$ is the $k^{th}$ entry of vector $x_i$. The subscript k denotes the $k^{th}$ block of the referred vectors. Stacking the two receive antenna models results in a new R×D vector model at the $k^{th}$ block in frequency domain $$r_{r,k} := \begin{bmatrix} r_{0,k} \\ r_{1,k} \end{bmatrix} = \sum_{i=0}^{S-1} \begin{bmatrix} d_{i,0,k} \\ d_{i,1,k} \end{bmatrix} x_{i,k} + \begin{bmatrix} n_{0,k} \\ n_{1,k} \end{bmatrix} := \sum_{i=0}^{S-1} d_{i,k} x_{i,k} + v_k \qquad (8a)$$

The dimension of $r_k$ is 32×1 and the frequency domain equivalent channel vector at block k, $d_{i,k}$, has a dimension of 32×1. Although this example is described with respect to two antennas, the present disclosure also contemplates fewer or more than two antennas.

When determining a channel estimate $x_0$ in a frequency domain, we can estimate each $x_{0,k}$ separately because all entries of $x_0$ are independent and identically distributed. Accordingly, the linear MMSE estimator for $x_{0,k}$ is:

$$\hat{x}_{0,k} = d_{0,k}^H R_{rr,k}^{-1} r_k \qquad (9)$$

In Equation 9, $R_{rr,k}$ is a covariance matrix at block k and $d_{0,k}^H$ is a channel. The covariance matrix may vary in size. In one configuration, the covariance matrix is 32×32. After determining the channel estimates for all N frequency domain symbols, the estimates may be stacked to obtain an estimate for $x_0$.

According to the present aspect, based on the R×D vector model for the $k^{th}$ block in a frequency domain (Equation 8a), the receiver may compute a frequency domain matrix at the $k^{th}$ block. The receiver may iteratively compute an inverted covariance matrix in a frequency domain one channel code at a time.

Block FFT operations can block diagonalize a frequency domain covariance matrix, and therefore, the complexity of subsequent covariance matrix inversion is reduced or significantly reduced. That is, instead of inverting 32N×32N matrices, only N 32×32 matrixes are inverted. It should be noted that inverting 32×32 matrices is still complex. Still, iterative matrix inversions may achieve a lower complexity under common LMUD application scenarios.

Based on Equation 8a (e.g., channel estimate and noise estimate), a frequency domain covariance matrix at the $k^{th}$ block can be computed as $$R_{rr,k} = \sum_{i=0}^{S-1} d_{i,k} d_{i,k}^H + \partial^2 I \qquad (10)$$

According to the current aspect, the covariance matrix structure enables a lower complexity in the receiver system. In equation 9, each d vector is associated with an active Walsh channel. When the number of active Walsh channels is low, then the desired signal may be in a relatively small subspace. Therefore, the receiver may only process a few iterations for the matrix inversion, thereby lowering the complexity of the system. In a typical system, R is treated as a constant, and therefore, the matrix iterations may not be dynamically adjusted, thereby leading to a higher system complexity. Accordingly, the present aspect relies on signal structure to determine the number of iterations for the matrix inversion. That is, as previously discussed, when the number of active Walsh channels is small, then the complexity is low.

In Equation 10, $d_{i,k}$ is the 32×1 equivalent frequency domain channel vector corresponding to an active Walsh channel. It should be noted that explicitly constructing $R_{rr,k}$ may not be necessary for an actual implementation.

The computation of an inversion of the equivalent frequency domain vectors $d_{i,k}$ and $R_{rr,k}$ may be iteratively performed. An iterative matrix inversion is not a mathematically complex process, therefore the iterative matrix inversion is desirable for a hardware implementation. The starting point of the iterations is a simple scaled identity matrix $$R_0 = \partial^2 I \tag{11}$$

Accordingly, only a single scalar is inverted. To numerically stabilize the entire iterative inversion process, $\partial^2$ is greater than or equal to 1% $I_0$, where $I_0$ is the total received chip energy.

In the $i^{th}$ subsequent iteration, the $i^{th}$ active Walsh channel is addressed. The covariance matrix at step j is $$R_{i+1} = R_i + d_{i,k} d_{i,k}^H \tag{12}$$

The covariance matrix of Equation 12 is the matrix that is inverted by the receiver. The corresponding inverted covariance matrix is $$R_{i+1}^{-1} = R_i^{-1} - (R_i^{-1} d_{i,k})(1 + d_{i,k}^H R_i^{-1} d_{i,k})^{-1} (R_i^{-1} d_{i,k})^H \tag{13}$$

However, according to the current aspect, the inverted covariance matrix of Equation 13 is not computed. Rather, the computation may utilize previously computed $R_i^{-1}$ matrices. To reuse intermediate calculations, a 32×1 vector is defined as $$t = R_i^{-1} d_{i,k} \tag{14}$$

In Equation 13, $d_{i,k}$ is a frequency domain channel vector. As previously discussed, the starting point of the iterations is a scaled identity matrix (Equation 11), after computing t for the first time, in subsequent iterations, $R_i^{-1}$ is a previous inverted covariance matrix.

Utilizing the vector defined in Equation 13 the receiver utilizes the following Equation calculating the inverted covariance matrix $$R_{i+}^{-1} = R_i^{-1} - t(1 + d_{i,k}^H t)^{-1} t^H \tag{15}$$

Accordingly, the iterative inverted covariance matrix calculation utilizes a single scalar $1 + d_{i,k}^H t$ at each channel. The inverted covariance matrix is calculated for each active Walsh channel. Once the inverted covariance matrix is calculated for an active Walsh channel (N), an inverted covariance matrix is calculated for the next active Walsh channel (N+1). The process is repeated until the inverted covariance matrix is calculated for all active Walsh channels.

An iterative matrix inversion may not always be the least complex solution. For example, when the number of strong Walsh channels is large, iterative matrix inversion may incur higher complexity in comparison to direct matrix inversion alternatives. Therefore, according to some aspect, the number of iterations may be limited to a specific value (e.g., $N_{max}$).

The receiver may utilize the inverted covariance matrix and the frequency domain and time domain channel estimates to compute receiver demodulation coefficients.

Based on Equation 9, the frequency domain linear MMSE estimate is $$\hat{x}_0 = \begin{bmatrix} d_{0,1}^H R_{rr,1}^{-1} & 0 & 0 \\ 0 & \ddots & 0 \\ 0 & 0 & d_{0,N}^H R_{rr,N}^{-1} \end{bmatrix} \begin{bmatrix} r^1 \\ \vdots \\ r_n \end{bmatrix} \tag{16}$$

In Equation 16, $r_1 \ldots r_n$ are frequency domain R×D vectors defined in Equation 8a. The time domain vector estimate may be generated by using a conventional inverse FFT (IFFT), such as $$\hat{s}_0 = F^H \hat{x}_0 \tag{17}$$

According to some aspects, in order to compute time domain LMUD coefficients, the frequency domain LMUD coefficients are separated into two parts corresponding to the two receive antennas, respectively. At the kth block, the two matrices may be defined as $$[z_{0,k} z_{1,k}] = d_{0,k}^H R_{rr,k}^{-1} \quad k \in \{1, \ldots, N\} \tag{18}$$

In Equation 18, the first subscript of Z indicates a receive antenna index, $z_{0,k}$ and $z_{1,k}$ matrices have a dimension of 1×16. Accordingly, the time domain transmitted symbol vector estimate may be computed as $$\hat{s}_0 = F^H \begin{bmatrix} Z_{0,1} & 0 & 0 \\ 0 & \ddots & 0 \\ 0 & 0 & Z_{0,N} \end{bmatrix} F_Q y_0 + F^H \begin{bmatrix} Z_{1,1} & 0 & 0 \\ 0 & \ddots & 0 \\ 0 & 0 & Z_{1,N} \end{bmatrix} F_Q y_1 := \tag{19}$$

$$F^H Z_0 F_Q y_0 + F^H Z_1 F_Q y_1$$

In Equation 19, R×D LMUD weights are divided in matrices Z0 and Z1 in the frequency domain. The time domain matrix for each antenna may be defined as $$T_0 := F^H Z_0 F_Q \tag{20}$$

$$T_1 := F^H Z_1 F_Q \tag{21}$$

The dimension for each antenna time domain LMUD matrix is N×16N. $T_0$ and $T_1$ are not computed according to Equations 20 and 21, respectively. Rather, the receiver may only compute the first columns $T_0$ and $T_1$ with a single IFFT operation to reduce complexity. The Equations are $$F^H \begin{bmatrix} Z_{0,1} \\ \vdots \\ Z_{0,N} \end{bmatrix} := \begin{bmatrix} \Omega_{0,1} \\ \vdots \\ \Omega_{0,N} \end{bmatrix} \tag{22}$$

$$F^H \begin{bmatrix} Z_{1,1} \\ \vdots \\ Z_{1,N} \end{bmatrix} := \begin{bmatrix} \Omega_{1,1} \\ \vdots \\ \Omega_{1,N} \end{bmatrix} \tag{23}$$

The resulting block column has a dimension N×16. In floating point implementations, the first row with dimension 1×16N is utilized. The first row may be computed as follows:

$$\lfloor \Omega_{0,1} \Omega_{0,N} \ldots \Omega_{0,2} \rfloor \tag{24}$$

$$\lfloor \Omega_{1,1} \Omega_{1,N} \ldots \Omega_{1,2} \rfloor \tag{25}$$

In Equations 24 and 24, $\Omega_{i,j}$ are 1×16 row vectors computed via IFFT operations. It should be noted that the conversion of frequency domain receiver coefficients to time domain is not required and the disclosure is also contemplated for aspects that do not convert frequency domain receiver coefficients to time domain.

Once the time domain MUD and frequency domain MUD are derived, the receiver may derive the symbol estimates.

Figure 4:
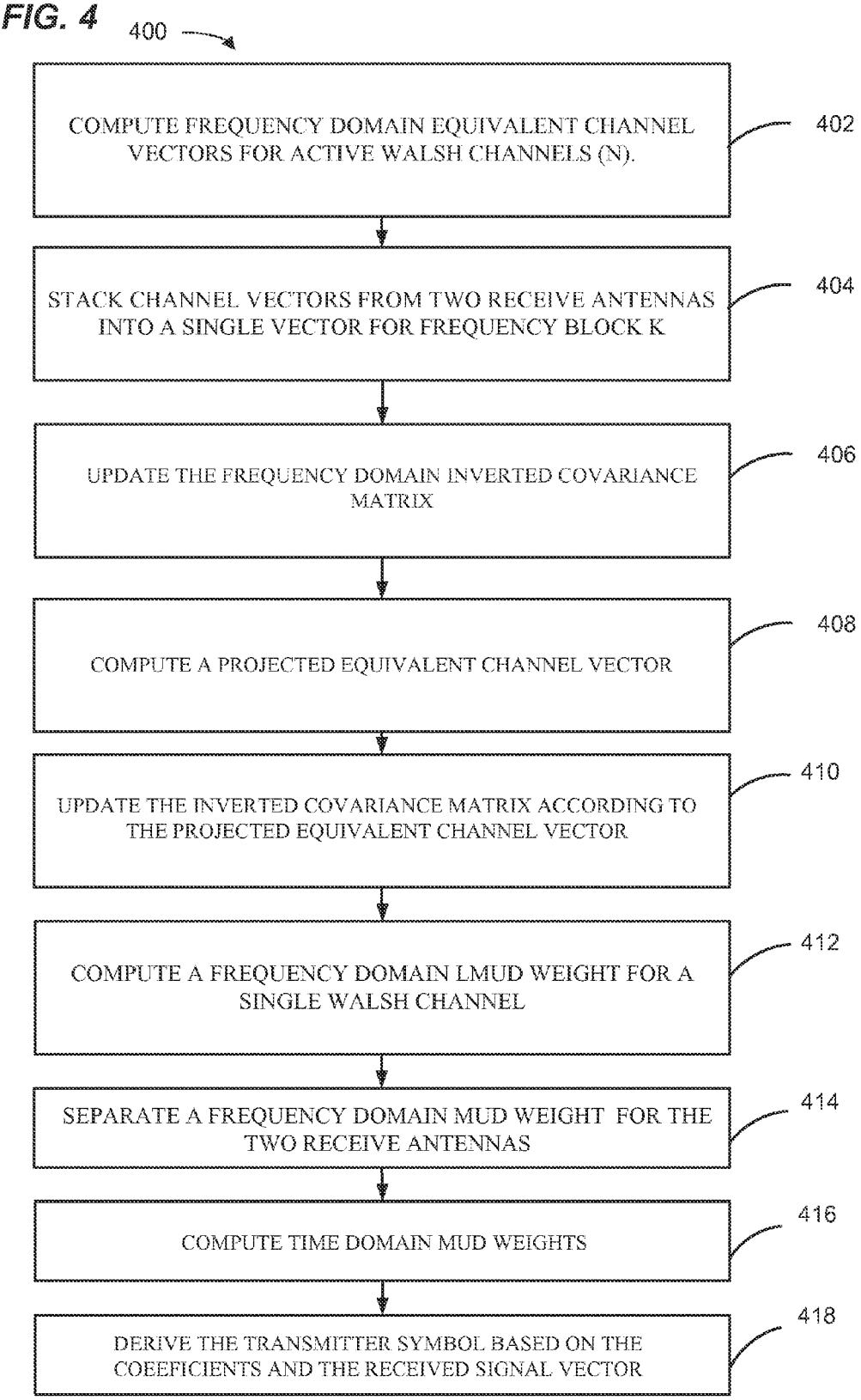
FIG. 4 is a block diagram illustrating a method for computing the iterative frequency domain multiuser detectors according to one aspect of the present disclosure.

A method 400 for computing the iterative frequency domain multiuser detectors is illustrated in FIG. 4. At block 402, frequency domain equivalent channel vectors are computed for each active Walsh channels (N).

A scrambled Walsh vector $u_{i,Q}$ may be calculated for the active Walsh code. A chip rate channel coefficient vector may be defined from the following equation $$h_{ir} = [h_0, h_1, \ldots, h_L]^T \tag{18}$$

Equation 18 is the first L+1 entries of the first column of matrix $H_{ir}$, the remaining entries of the column are filled with 0 (assuming that 16N is greater than L). Next the linear convolutions are calculated as follows:

$$h_{i_r} * u_{i,Q} \quad (19)$$

That is, the frequency domain equivalent channel vectors are calculated from the received time domain vector. The frequency domain equivalent channel vectors are computed as follows $$F_Q \begin{bmatrix} h_{i_r} * C_i w_i \\ 0 \end{bmatrix} = \begin{bmatrix} d_{i,r,1} \\ \vdots \\ d_{i,r,N} \end{bmatrix}, r \in \{0, 1\} \quad (20)$$

At block 404, channel vectors are stacked from two receive antennas into a single vector for frequency block k as follows $$d_{i,k} = \begin{bmatrix} d_{i,0,k} \\ d_{i,1,k} \end{bmatrix}, k \in \{1, \ldots, N\} \quad (21)$$

At block 406, the frequency domain inverted covariance matrix $R_{rr,k}$ $k \in \{1, \ldots, N\}$ are updated. The inverted covariance matrix is updated for each Walsh channel as shown in blocks 408 and 410. At block 408 a projected equivalent channel vector is computed (Equation 14). At block 410 the inverted covariance matrix is updated according to the projected equivalent channel vector of Equation 14 (Equation 15).

It should be noted that the present aspect does not include a construction block for covariance matrices. Rather, the iterative computation converts each Walsh channel to frequency domain via block FFT.

At block 412 a frequency domain LMUD weight for a single Walsh channel is computed according to Equation 15. At block 414 a frequency domain MUD weight is separated for the two receive antennas as follows $$[Z_{(0,k)} Z_{(1,k)}] = d_{(0,k)}^H R_{(rr,k)}^{-1} k \in \{1, \ldots, N\} \quad (22)$$

At block 416, time domain MUD weights are computed for each receive antenna. Finally, at block 418 the receiver derives the transmitter symbol based on the coefficients and the received signal vector.

A decoding process may be initialized after generating estimates of the transmitted channel symbols. The decoding process may include determining an average receive SINR, computing log-likelihood ratios (LLRs) of information bits, and/or performing actual channel decoding for convolutional or turbo codes.

According to an aspect of the present disclosure, the equivalent block FFT domain channel matrices $D_{i,r}$ calculated using Equation 6 may be calculated using alternate equations.

The frequency domain block diagonal channel matrix is generated using the equivalent block FFT domain channel matrices $D_{i,r}$ (not shown in FIG. 4).

The solution described above are distinguishable from the typical direct matrix inversion based approach because, for example, according to the present solutions, a frequency domain covariance matrix inversion is iteratively performed, frequency domain covariance matrices are not explicitly constructed, and frequency domain channel coefficients are reused in the computation of frequency domain MUD coefficients.

Figure 5:
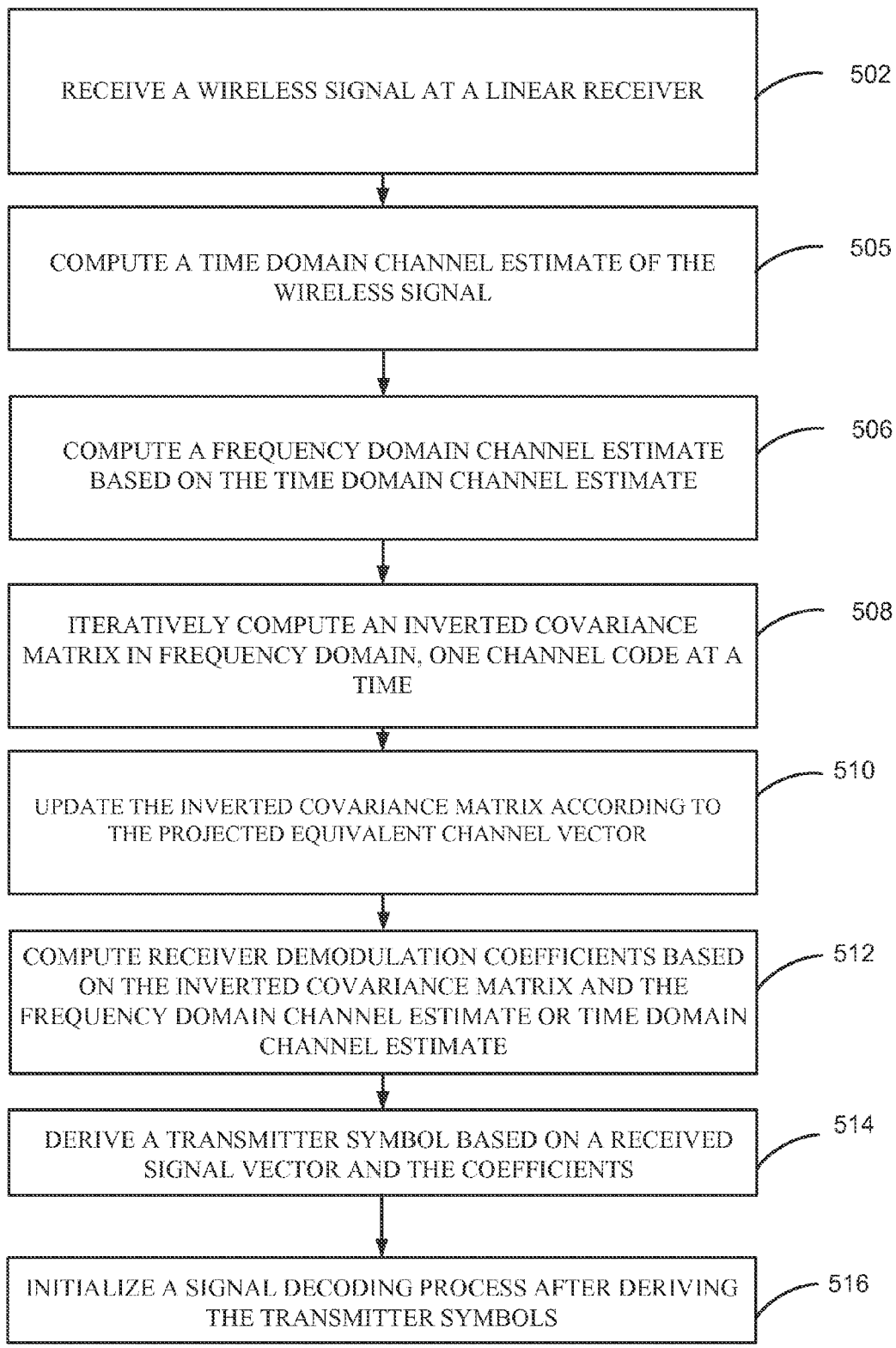
FIG. 5 is a block diagram illustrating a method for deriving a transmitter symbol according to one aspect of the present disclosure.

FIG. 5 shows a wireless communication method 400 according to one aspect of the disclosure. A UE receives a wireless signal at a linear receiver, as shown in block 402. The UE also computes a time domain channel estimate of the wireless signal, as shown in block 504. Furthermore, as shown in block 506, the UE computes a frequency domain channel estimate based on the time domain channel estimate. Additionally, the UE iteratively computes an inverted covariance matrix in frequency domain, one channel code at a time, as shown in block 508. Moreover, the UE computes receiver demodulation coefficients based on the inverted covariance matrix and the frequency domain channel estimate or time domain channel estimate, as shown in block 510. As shown in block 512, the UE derives a transmitter symbol based on a received signal vector and the coefficients. At block 514 the UE initializes a signal decoding process after deriving the transmitter symbols. At block 516, a signal decoding process is initialized.

Figure 6:
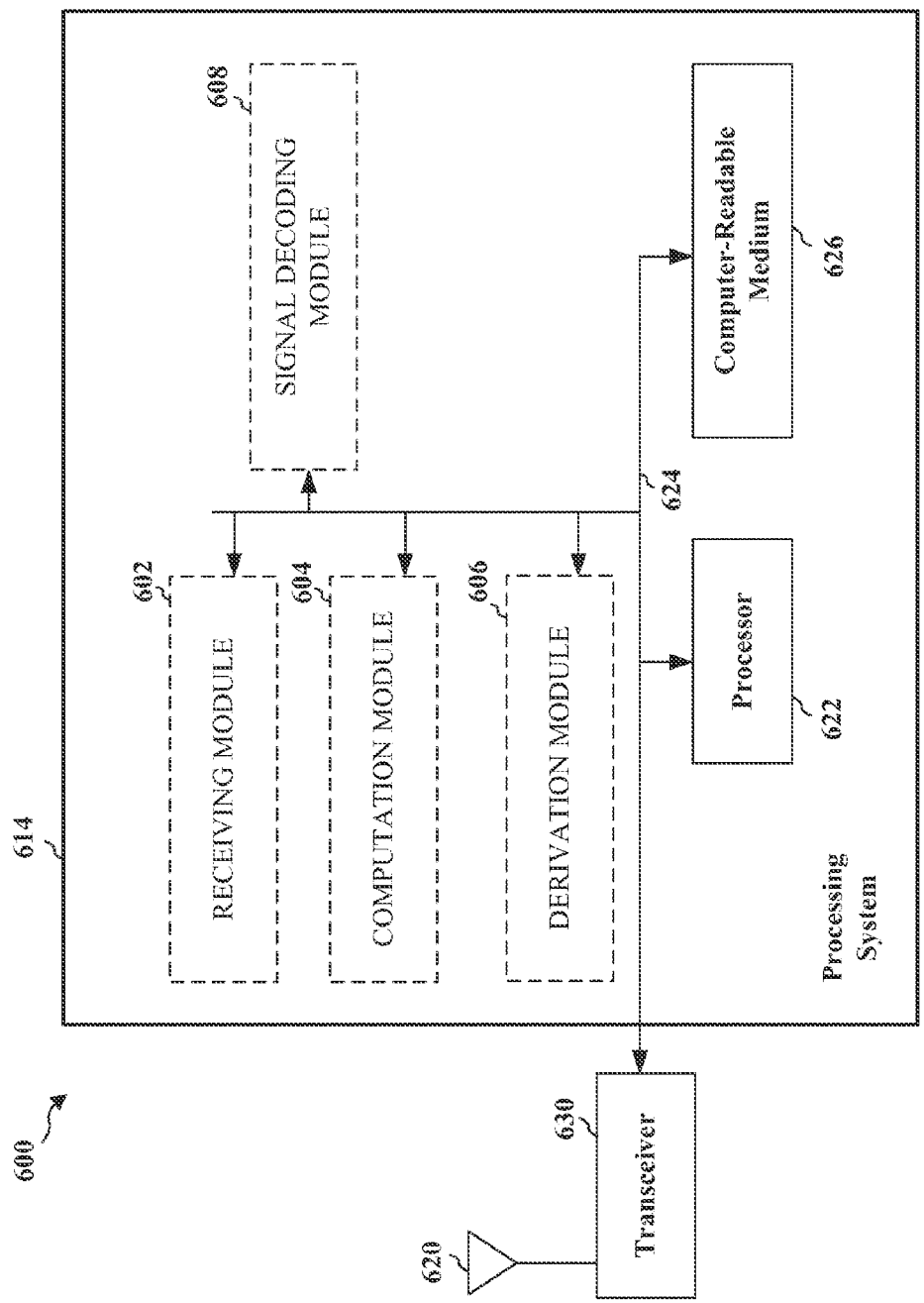
FIG. 6 is a diagram illustrating an example of a hardware implementation for an apparatus employing a processing system according to one aspect of the present disclosure.

FIG. 6 is a diagram illustrating an example of a hardware implementation for an apparatus 600 employing a processing system 614. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware modules, represented by the processor 622 the modules 602, 604, 606, 608 and the computer-readable medium 626. The bus 624 may also link various other circuits such as timing sources, peripherals, voltage regulators, and power management circuits, which are well known in the art, and therefore, will not be described any further.

The apparatus includes a processing system 614 coupled to a transceiver 630. The transceiver 630 is coupled to one or more antennas 620. The transceiver 630 enables communicating with various other apparatus over a transmission medium. The processing system 614 includes a processor 622 coupled to a computer-readable medium 626. The processor 622 is responsible for general processing, including the execution of software stored on the computer-readable medium 626. The software, when executed by the processor 622, causes the processing system 614 to perform the various functions described for any particular apparatus. The computer-readable medium 626 may also be used for storing data that is manipulated by the processor 622 when executing software.

The processing system 614 includes a receiving module 602 for receiving a wireless signal at a linear receiver. The processing system 614 includes a computation module 604 for computing a time domain channel estimate of the wireless signal, computing a frequency domain channel estimate based on the time domain channel estimate, iteratively computing an inverted covariance matrix in frequency domain, one channel code at a time, and computing receiver demodulation coefficients based on the inverted covariance matrix and the frequency domain channel estimate or time domain channel estimate. Furthermore, the processing system 616 also includes a derivation module 606 for deriving a transmitter symbol based on a received signal vector and the coefficients. Moreover, the processing system 616 also includes a signal decoding module 608 for deriving a transmitter symbol based on a received signal vector and the coefficients. For decoding a signal after the transmitter symbol has been derived. The modules may be software modules running in the processor 622, resident/stored in the computer-readable medium 626, one or more hardware modules coupled to the processor 622, or some combination thereof. The processing system 614 may be a component of the UE 360 and may include the memory 392, and/or the controller/processor 390.

In one configuration, an apparatus such as a UE is configured for wireless communication including means for receiving, computing, deriving, and signal decoding. In one aspect, the above means may be the antennas 362, the receiver 364, the channel processor 394, the receive frame processor 360, the receive processor 370, the transmitter 366, the transmit frame processor 382, the transmit processor 380, the controller/processor 390, the memory 392, iterative covariance module 391, receiving module 602, computation module 604, derivation module 606, signal decoding module 608, and/or the processing system 614 configured to perform the functions recited by the aforementioned means. In another aspect, the aforementioned means may be a module or any apparatus configured to perform the functions recited by the aforementioned means.

Several aspects of a telecommunications system has been presented with reference to TD-SCDMA systems. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
receiving a wireless signal at a linear receiver;
computing a time domain channel estimate of the wireless signal;
computing a frequency domain channel estimate based on the time domain channel estimate;
iteratively computing an inverted covariance matrix in frequency domain, one channel code at a time;
computing receiver demodulation coefficients based on the inverted covariance matrix and the frequency domain channel estimate or time domain channel estimate;
deriving a transmitter symbol based on a received signal vector and the receiver demodulation coefficients; and
initializing a signal decoding process after deriving the transmitter symbols.

2. The method of claim 1, in which the time domain channel estimate is for a time division synchronous code division multiple access (TD-SCDMA) network.

3. The method of claim 1, in which the iterative computing comprises:
   initializing the inverted covariance matrix;
   computing an intermediate vector based on the frequency domain channel estimate, associated with a first channel code and the initialized inverted covariance matrix;
   updating the inverted covariance matrix based on the intermediate vector;
   repeatedly computing an updated intermediate vector based on the frequency domain channel estimate, associated with another channel code and a previous updated inverted covariance matrix; and
   updating the inverted covariance matrix based on the updated intermediate vector.

4. The method of claim 3, in which the intermediate vector is calculated as $t=R_i^{-1}d_{i,k}$,
   in which $R_i^{-1}$ is a previous inverted covariance matrix, $d_{i,k}$ is the frequency domain channel estimate, d is a vector, i is a beam index, and k is the $k^{th}$ block of the vector.

5. The method of claim 4, in which the updating the inverted covariance matrix is calculated as $R_{i+1}^{-1}=R_i^{-1}-t(1+d_{i,k}^H t)^{-1}t^H$.

6. An apparatus for wireless communication, comprising:
   means for receiving a wireless signal at a linear receiver;
   means for computing a time domain channel estimate of the wireless signal;
   means for computing a frequency domain channel estimate based on the time domain channel estimate;
   means for iteratively computing an inverted covariance matrix in frequency domain, one channel code at a time;
   means for computing receiver demodulation coefficients based on the inverted covariance matrix and the frequency domain channel estimate or time domain channel estimate;
   means for deriving a transmitter symbol based on a received signal vector and the receiver demodulation coefficients; and
   means for initializing a signal decoding process after deriving the transmitter symbols.

7. The apparatus of claim 6, in which the time domain channel estimate is for a time division synchronous code division multiple access (TD-SCDMA) network.

8. The apparatus of claim 6, in which the means for iterative computing comprises:
   means for initializing the inverted covariance matrix;
   means for computing an intermediate vector based on the frequency domain channel estimate, associated with a first channel code and the initialized inverted covariance matrix;
   means for updating the inverted covariance matrix based on the intermediate vector;
   means for repeatedly computing an updated intermediate vector based on the frequency domain channel estimate, associated with another channel code and a previous updated inverted covariance matrix; and
   means for updating the inverted covariance matrix based on the updated intermediate vector.

9. The apparatus of claim 8, in which the means for computing the intermediate vector calculates: $t=R_i^{-1}d_{i,k}$,
   in which $R_i^{-1}$ is a previous inverted covariance matrix, $d_{i,k}$ is the frequency domain channel estimate, d is a vector, i is a beam index, and k is the $k^{th}$ block of the vector.

10. The method of claim 9, in which the means for updating the inverted covariance matrix calculates: $R_{i+1}^{-1}=R_i^{-1}-t(1+d_{i,k}^H t)^{-1}t^H$.

11. A computer program product for wireless communication in a wireless network, comprising:
    a non-transitory computer-readable medium having non-transitory program code recorded thereon, the program code comprising:
      program code to receive a wireless signal at a linear receiver;
      program code to compute a time domain channel estimate of the wireless signal;
      program code to compute a frequency domain channel estimate based on the time domain channel estimate;
      program code to iteratively compute an inverted covariance matrix in frequency domain, one channel code at a time;
      program code to compute receiver demodulation coefficients based on the inverted covariance matrix and the frequency domain channel estimate or time domain channel estimate;
      program code to derive a transmitter symbol based on a received signal vector and the receiver demodulation coefficients; and
      program code to initialize a signal decoding process after deriving the transmitter symbols.

12. The computer program product of claim 11, in which the time domain channel estimate is for a time division synchronous code division multiple access (TD-SCDMA) network.

13. The computer program product of claim 11, in which the program code to iteratively compute comprises:
    program code to initialize the inverted covariance matrix;
    program code to compute an intermediate vector based on the frequency domain channel estimate, associated with a first channel code and the initialized inverted covariance matrix;
    program code to update the inverted covariance matrix based on the intermediate vector;
    program code to repeatedly compute an updated intermediate vector based on the frequency domain channel estimate, associated with another channel code and a previous updated inverted covariance matrix; and
    program code to update the inverted covariance matrix based on the updated intermediate vector.

14. The computer program product of claim 13, in which the program code to compute the intermediate vector calculates: $t=R_i^{-1}d_{i,k}$,
    in which $R_i^{-1}$ is a previous inverted covariance matrix, $d_{i,k}$ is the frequency domain channel estimate, d is a vector, i is a beam index, and k is the $k^{th}$ block of the vector.

15. The computer program product of claim 14, in which the program code to update the inverted covariance matrix calculates $R_{i+1}^{-1}=R_i^{-1}-t(1+d_{i,k}^H t)^{-1}t^H$.

16. An apparatus for wireless communication, comprising:
    a memory; and
    at least one processor coupled to the memory, the at least one processor being configured:
      to receive a wireless signal at a linear receiver;
      to compute a time domain channel estimate of the wireless signal;
      to compute a frequency domain channel estimate based on the time domain channel estimate;
      to iteratively compute an inverted covariance matrix in frequency domain, one channel code at a time;

to compute receiver demodulation coefficients based on the inverted covariance matrix and the frequency domain channel estimate or time domain channel estimate;
to derive a transmitter symbol based on a received signal vector and the receiver demodulation coefficients; and
to initialize a signal decoding process after deriving the transmitter symbols.

17. The apparatus of claim 16, in which the time domain channel estimate is for a time division synchronous code division multiple access (TD-SCDMA) network.

18. The apparatus of claim 16, in which the at least one processor is further configured:
to initialize the inverted covariance matrix;
to compute an intermediate vector based on the frequency domain channel estimate, associated with a first channel code and the initialized inverted covariance matrix;
to update the inverted covariance matrix based on the intermediate vector;
to repeatedly compute an updated intermediate vector based on the frequency domain channel estimate, associated with another channel code and a previous updated inverted covariance matrix; and
to update the inverted covariance matrix based on the updated intermediate vector.

19. The apparatus of claim 18, in which the at least one processor calculates the intermediate vector as $t=R_i^{-1}d_{i,k}$,
in which $R_i^{-1}$ is a previous inverted covariance matrix, $d_{i,k}$ is the frequency domain channel estimate, d is a vector, i is a beam index, and k is the $k^{th}$ block of the vector.

20. The apparatus of claim 19, in which the at least one processor updates the inverted covariance matrix as $R_{i+1}^{-1}=R_i^{-1}-t(1+d_{i,k}^H t)^{-1}t^H$.

* * * * *